(12) United States Patent
Clarke et al.

(10) Patent No.: US 7,213,837 B2
(45) Date of Patent: May 8, 2007

(54) AIRBAG MODULE

(75) Inventors: Curtis D. Clarke, Auburn Hills, MI (US); Steve Moon, Auburn Hills, MI (US)

(73) Assignee: Takata Restraint Systems, Inc., Greensboro, NC (US)

( * ) Notice: Subject to any disclaimer, the term of this patent is extended or adjusted under 35 U.S.C. 154(b) by 35 days.

(21) Appl. No.: 11/011,063

(22) Filed: Dec. 15, 2004

(65) Prior Publication Data

US 2006/0125215 A1    Jun. 15, 2006

(51) Int. Cl.
*B60R 21/16* (2006.01)

(52) U.S. Cl. .................... 280/731; 280/743.1

(58) Field of Classification Search ............ 280/728.3, 280/731, 743.1
See application file for complete search history.

(56) References Cited

U.S. PATENT DOCUMENTS

| | | | |
|---|---|---|---|
| 5,498,023 A | 3/1996 | Adams et al. | |
| 5,765,867 A | 6/1998 | French | |
| 5,908,203 A * | 6/1999 | Peterson | 280/728.3 |
| 6,145,879 A | 11/2000 | Lowe et al. | |
| 6,364,349 B1 | 4/2002 | Kutchey et al. | |
| 6,371,510 B1 * | 4/2002 | Marriott et al. | 280/730.1 |
| 6,626,456 B2 | 9/2003 | Terbu et al. | |
| 2002/0195803 A1 | 12/2002 | Terbu et al. | |
| 2003/0189319 A1 | 10/2003 | Soderquist | |

* cited by examiner

*Primary Examiner*—Faye M. Fleming
(74) *Attorney, Agent, or Firm*—Foley & Lardner LLP (57) ABSTRACT

An occupant protection device including a wrap for holding an inflatable air bag cushion in a folded shape. The wrap includes a tear seam forming a substantial "U" shape. The tear seam directs the initial airbag deployment toward the bottom of the airbag module and between the lower rim of a steering wheel and a driver. The wrap protects a fifth percentile female in close proximity to the lower rim of the steering wheel.

18 Claims, 7 Drawing Sheets

AIRBAG MODULE

BACKGROUND

The present invention relates generally to the field of airbag modules.

In conventional airbag systems, airbag modules include a folded airbag covered with a cover. In the event of a vehicle collision, an inflator, i.e. a gas generator, ejects gas to deploy and inflate the airbag rapidly to a position adjacent a vehicle occupant. The deploying airbag pushes against and opens the cover.

In conventional driver's side airbag systems, the airbag module includes a retainer to which the folded airbag is mounted. The cover overlies the folded airbag and is also secured to the retainer. The cover is positioned between the folded airbag and the occupant. The airbag is generally positioned within the steering wheel. When collision involving the vehicle is imminent or has occurred, as detected by a sensor, the inflator is activated to deploy the airbag.

Conventional airbag systems may also include a fabric cover that encapsulates all or at least part of the folded airbag, such as discussed in, for example, U.S. Pat. No. 6,145,879 (incorporated by reference herein in its entirety). The aforementioned patent discusses a heat shrinkable fabric cover with a predetermined region of weakness that extends along the length of the cover and folded airbag. However, such conventional fabric covers do not direct the deploying airbag in any manner.

The airbag is deployed out of the steering wheel and toward the driver. However, for certain conventional airbags, individuals positioned near a lower rim of the steering wheel, such as a fifth percentile female, are in danger of coming into contact with the lower rim of the steering wheel and missing the airbag.

Thus, there remains a need to protect a driver positioned close to a steering wheel during a collision. In particular, there remains a need to protect a fifth percentile female driver positioned close to the lower rim of the steering wheel during a collision.

SUMMARY

According to one embodiment of the invention, an occupant protection device is provided. The occupant protection device includes an airbag, an inflator for providing inflation gas to inflate the airbag, and a wrap initially covering the airbag when the airbag is in a folded position. The wrap includes a tear seam configured to tear upon inflation of the airbag. The tear seam directs the initial airbag deployment towards the bottom of the airbag module According to another embodiment of the present invention, an airbag module is provided. The airbag module includes an airbag, an inflator for providing inflation gas to inflate the airbag, and a wrap initially covering the airbag when the airbag is in a folded position. The wrap includes a tear seam configured to tear open upon inflation of the airbag. The tear seam forms a substantial U shape extending along the lower, center region of the wrap.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DESCRIPTION

Hereinafter, embodiments of the present invention will be described with reference to the attached drawings.

An occupant protection device 10 of an embodiment of the present invention is shown in FIGS. 1–5. The occupant protection device includes an airbag module including an airbag 30, an inflator 50 and a wrap 20. The airbag module may also include a cover 44 and a retainer 70. The inflator 50 provides the inflation gas to inflate and deploy the airbag 30 during a collision.

Figure 1:
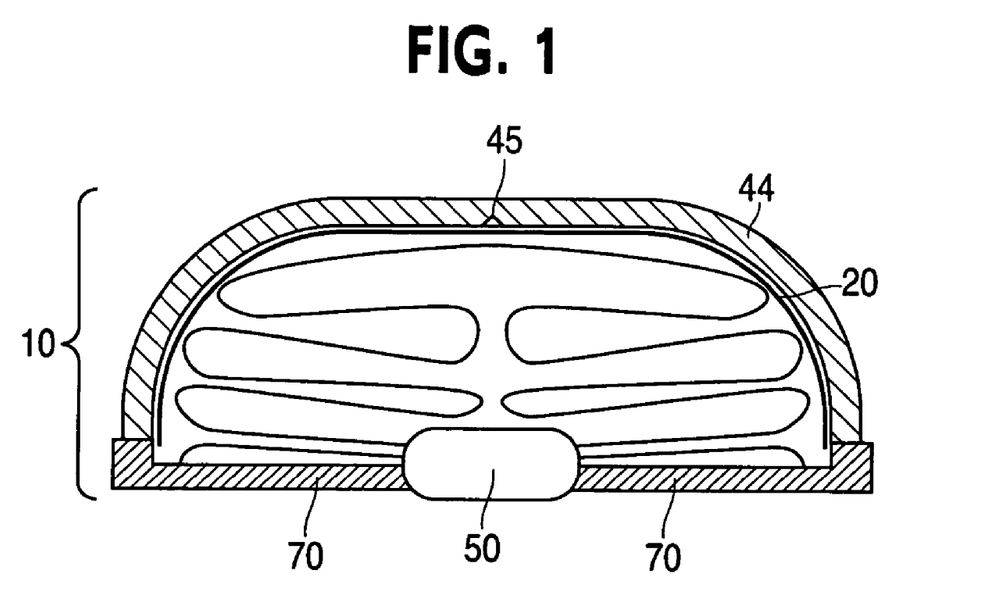
FIG. 1 is a sectional view of an occupant protection device according to an embodiment of the present invention.
Figure 2:
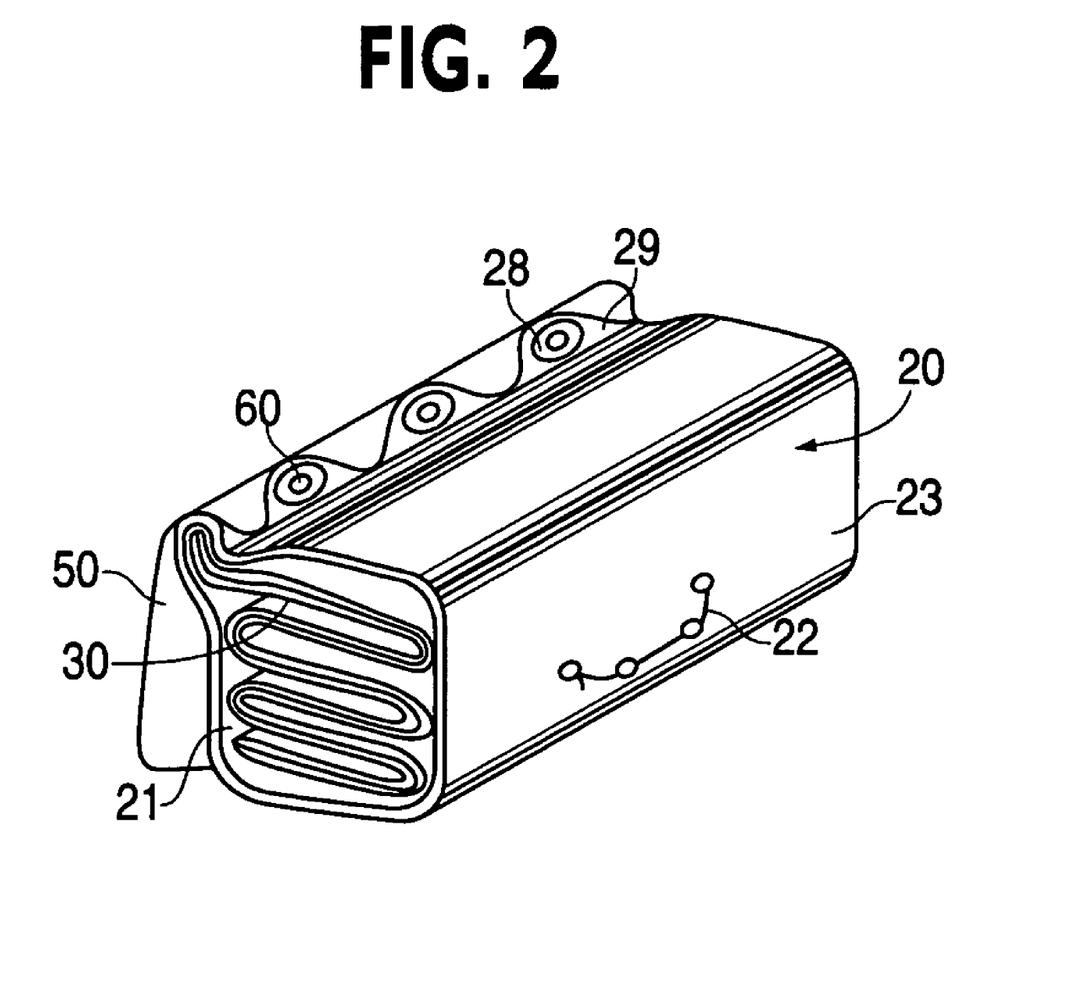
FIG. 2 is a perspective view of a wrap and airbag of the occupant protection device of FIG. 1.
Figure 4:
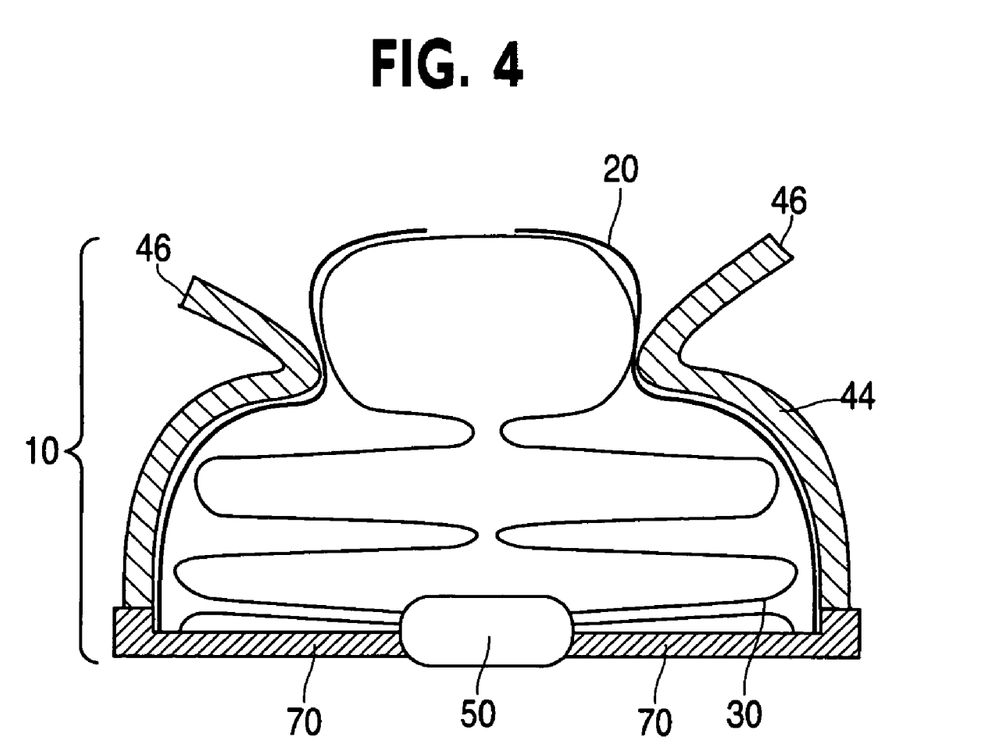
FIG. 4 is a sectional view during deployment of the occupant protection device of FIG. 1.
Figure 5:
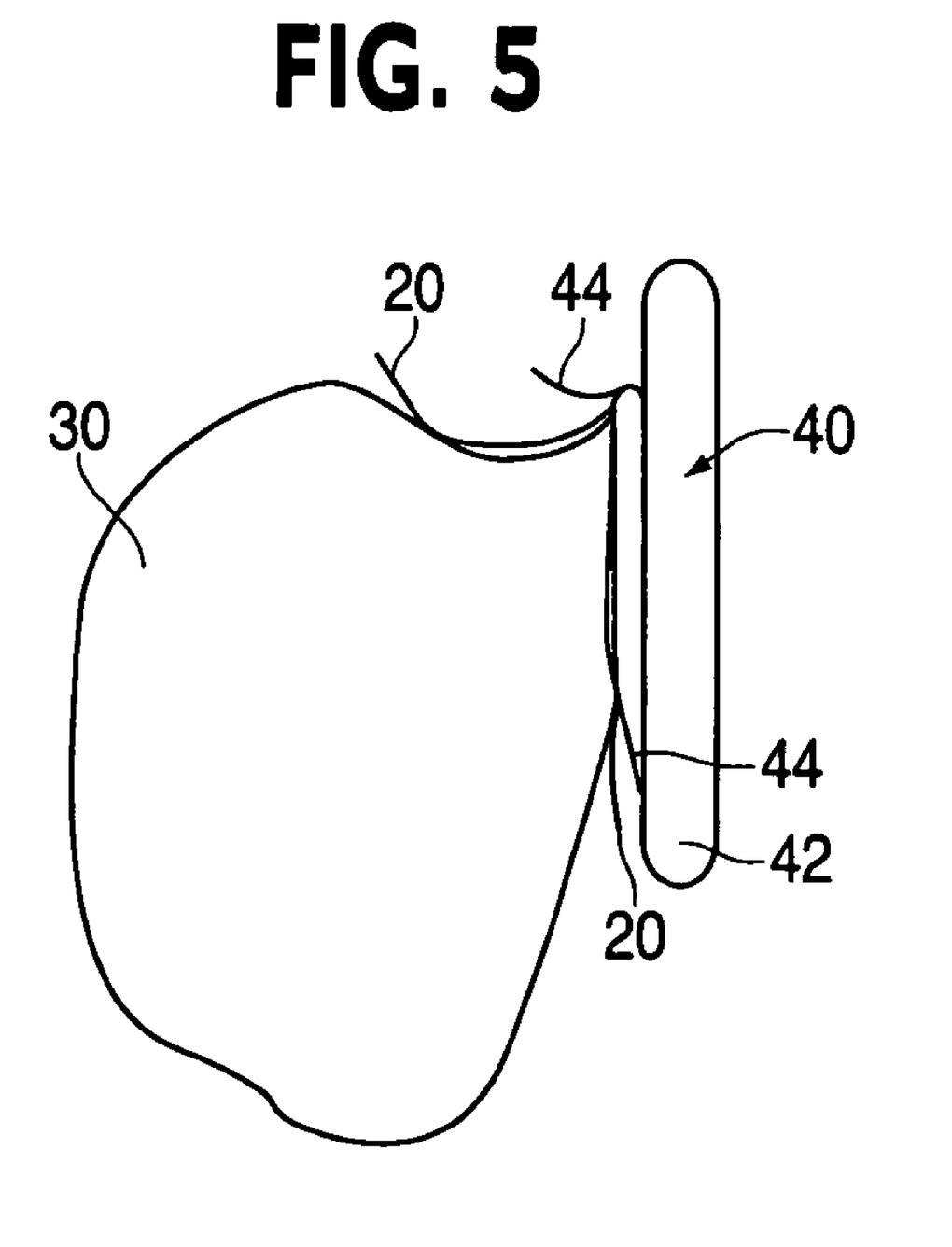
FIG. 5 is a side view of a deployed airbag of the occupant protection device of FIG. 1.
Figure 7:
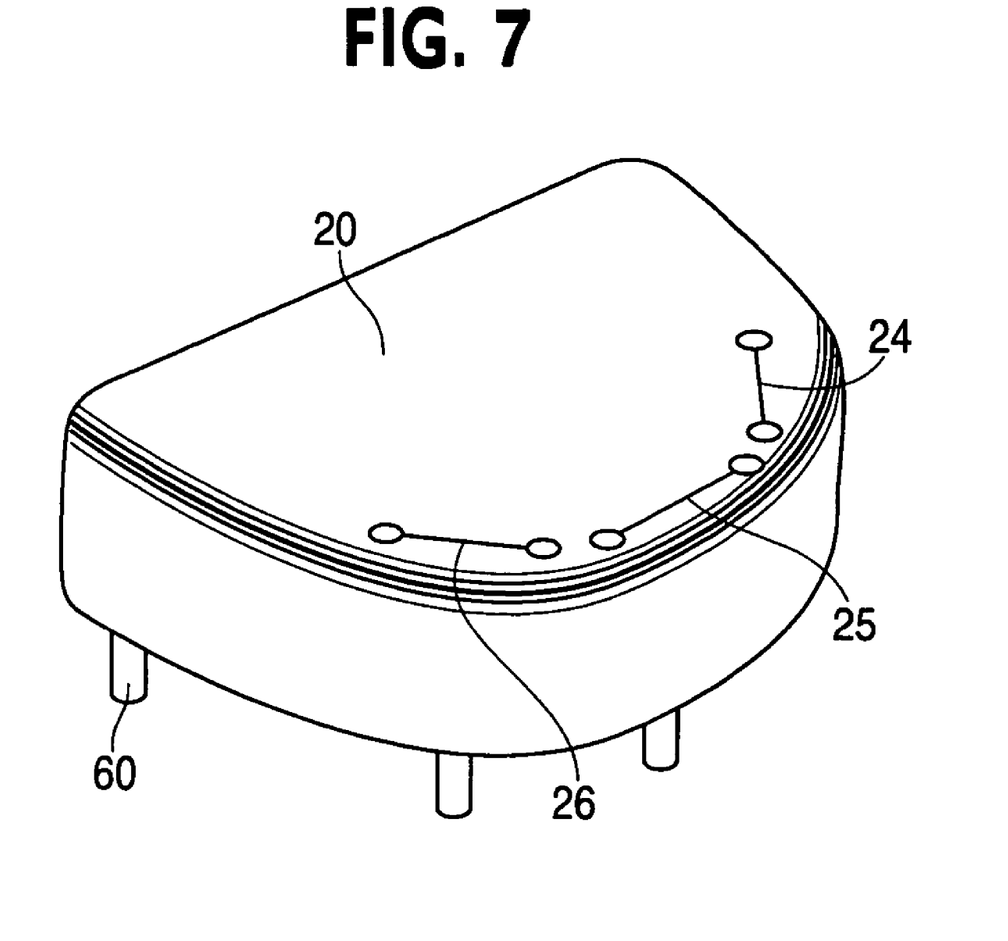
FIG. 7 is a perspective view of an airbag and wrap according to FIG. 6.

The airbag module, as shown in FIGS. 1 and 4, may be mounted in the steering wheel 40 of the vehicle or other suitable location. The airbag module is positioned within the steering wheel 40 of the vehicle in order to protect a driver in a collision, specifically a frontal collision, as shown in FIGS. 1, 4 and 5. However, the airbag module may be mounted along the dash, in a door, or any other suitable location for protecting a passenger or driver of a vehicle, as shown in FIGS. 2 and 7.

Cover 44 is attached to the retainer 70 such that an open area is created between the cover 44 and the retainer 70, as shown in FIG. 1. The cover 44 forms the barrier between the airbag 30 and the inside of the vehicle passenger cabin area. For example, the cover 44 may form the center portion of a steering wheel 40.

The cover 44 is generally formed of a plastic material. The cover 44 must be able to withstand any wear and tear derived from its position in the cabin of a vehicle and must also be able to break open upon deployment of the airbag 30.

The cover 44 may include a notch 45 or tear seam. The notch 45 is a weakened area that allows the cover 44 to break open upon deployment of the airbag 30. The airbag 30, as it is being filled with inflation gas, pushes with a force against the inside of the cover 44. The notch 45 or weakened area allows the cover 44 to break open at an appropriate location and at an appropriate time during deployment of the airbag 30.

The inflator 50, shown in FIGS. 1, 2 and 4, may comprise a gas generant or propellant in order to provide inflation gas to the airbag 30. In addition, the inflator 50 may include a decomposing type material as the source of the pressurized gas for the airbag 30. The inflator 50 may include an igniter or initiator assembly (not shown). The igniter receives a signal from a controller in order to initiate operation of the inflator 50 when the controller determines a collision is occurring.

The wrap 20 is configured to initially cover the airbag 30 when the airbag 30 is in a folded position, as can be seen in, for example, FIG. 1. The wrap 20 holds the airbag 30 in the folded position and helps maintain the proper folded position of the airbag 30.

The wrap 20 may comprise a single fabric panel and includes an inside surface 21 and an outside surface 23. The inside surface 21 of the wrap 20 is adjacent the folded airbag 30. The outside surface 23 of the wrap 20 is adjacent the cover 40.

The wrap 20 may only extend along the portion of the folded airbag 30 adjacent the cover 44. However, the wrap 20 may be of any suitable size, including a size large enough to wrap around the entire folded airbag 30.

The wrap 20 may be formed of a material, such as a fabric, that is pliable and capable of being folded around the airbag 30. The material of the wrap 20 may be the same as or similar to the material of the airbag 30. For example, the wrap may comprise a woven fabric. For ease in manufacturing the wrap may be cut from the same fabric blank as other airbag components such as, for example, the tethers, heat shield and fabric panels.

The material of the wrap 20 must also be able to provide reinforcement to the airbag 30. The wrap 20 reinforces the initial inflating sections of the airbag 30 as the airbag 30 forces the notch 45 or weakened area of the cover 44 to break open. As the cover 44 breaks open, rough or sharp portions may be formed on the cover 44 along the broken portion 46. These rough or sharp portions could rip or tear open the airbag 30 at unwanted locations, which would prevent the airbag 30 from deploying as intended. The wrap 20 protects the airbag 30 from these rough or sharp portions and also prevents the airbag 30 from hitting or rubbing against the inside surface of the cover 44 before deployment.

Figure 3:
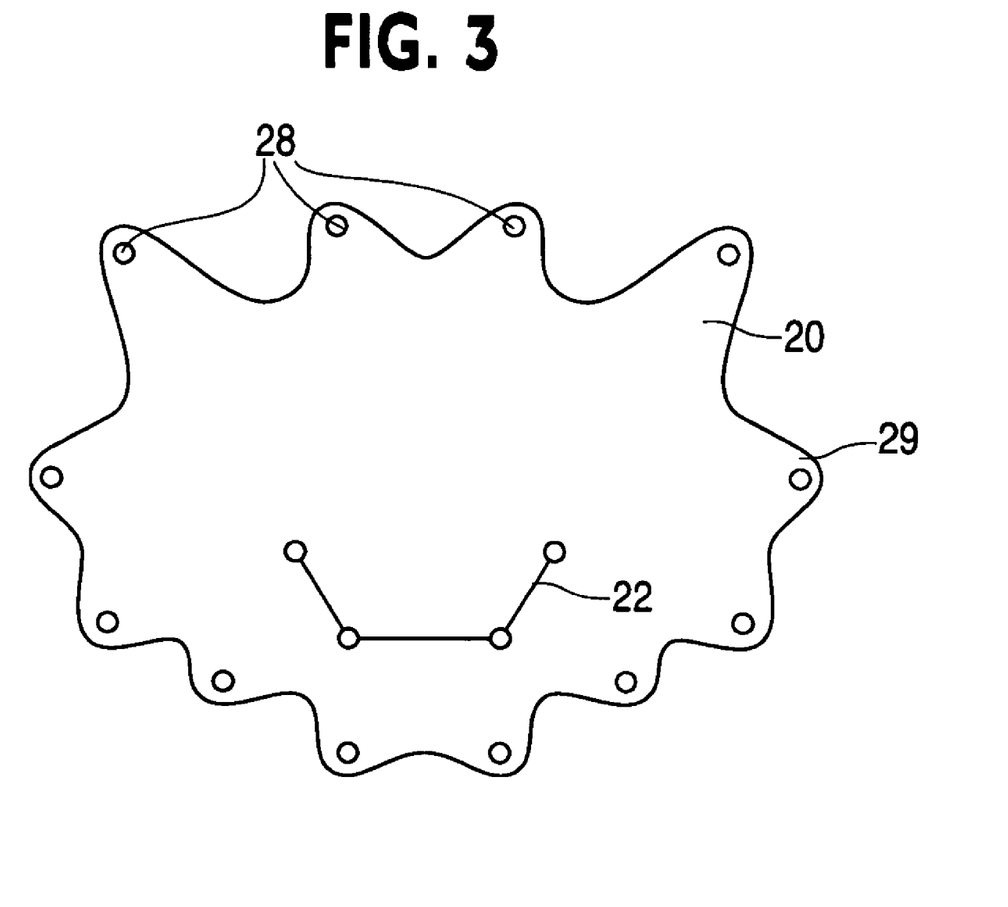
FIG. 3 is a view of the wrap of the occupant protection device of FIG. 1.

The wrap 20 includes a tear seam 22 configured to tear open the wrap 20 upon inflation of the airbag 30, shown in FIGS. 2 and 3. The tear seam 22 is positioned in the lower, center portion of the wrap 20. The tear seam 22 includes a bottom portion 22a and first and second extending portions 22b, 22c. The bottom portion 22a and the first and second extending portions 22b, 22c may form a curve, or a wide, substantially "U" shape.

The tear seam 22 may include a weakened area of reduced thickness in the wrap 20. As the airbag 30 is inflated, the airbag 30 is pushed against the wrap 20. The tear seam 22 allows the wrap 20 to break open upon a sufficiently strong force from the inflating airbag 30. Alternatively, the tear seam 22 may be formed by providing an intentional discontinuity in the fabric weave.

The tear seam 22 is configured to allow the wrap 20 to break open at the position of the tear seam 22 upon deployment of the airbag 30. The tear seam 22 directs the deployment of the airbag 30. The tear seam 22 is configured, by its shape, location and size, to direct the airbag to deploy toward the bottom of the airbag module. The tear seam 22 is positioned in the lower half and middle of the wrap 20, towards the bottom of the airbag module. As the airbag 30 is deployed, the airbag 30 pushes out the wrap 20 and because the tear is located in the lower half of the wrap 20, the wrap 20 breaks open at that location. The substantially "U" shape of the tear seam 22 forms a flap that is flipped up when the wrap 20 breaks open at the tear seam 22 and directs the airbag 40 down, as can be seen in, for example, FIG. 5. Thus, the airbag 30 is first directed into the cabin of an automobile toward the bottom of the airbag module.

Drivers that are small in stature, such as fifth percentile females, generally sit in close proximity to a vehicle's steering wheel 40. Upon a collision, the driver may be forced toward the steering wheel 40, specifically the lower rim 42. The tear seam 22 directs the airbag 30 to deploy down between the lower rim 42 of the steering wheel 40 and the passenger to thereby reduce the likelihood that the driver will contact the lower rim 42 of the steering wheel 40.

The airbag 30 is generally placed in the center of the wrap material 20. The position of the airbag 30 in the wrap 20 ensures that the folded airbag 30 is held properly by the wrap 20 and that the airbag 30 is positioned properly with respect to the tear seam 22.

The wrap 20, as shown in FIG. 3, also may include elongated portions 29 and connecting portions 28. The elongated portions 29 may wrap around the airbag 30 and are used, along with the connecting portions 28, to secure the wrap 20 to the occupant protection device 10. The elongated portions or tabs 29 may also connect the wrap 20 to the occupant protection device 10 by other suitable connecting mechanisms, such as adhesive, tacks, etc. As a result, the wrap 20 is able to remain in position while the airbag 30 is in a folded position and while the airbag 30 is deploying.

The wrap 20 may be attached to the retainer 70, inflator 50, cover 40, airbag 30, or to itself by attachment of the connecting portions 28. The connecting portions 28 may be holes that may be attached to the retainer 70, inflator 50, or cover 40 fasteners 60, or any other suitable connecting device. The fasteners 60 may be extend from the underneath of the airbag 30, as can be seen in FIG. 7, or any other suitable location. Preferably, the wrap 20 is connected to the retainer 70.

The shape, size and number of elongated portions 29 and connecting portions 28 depends on the size of the airbag 30 and manner of connecting the wrap 20 to the occupant protection system 10. An example of the elongated portions 29 and connecting portions 28 are shown in FIG. 3, however, any suitable number, size and shape may be used.

Alternatively, the occupant protection device 10 may be located in the dash, door, or other vehicle location. The wrap 20 and tear seam 22 may be configured to direct the deploying airbag 30 towards the lower portion of the airbag module 15 to prevent injury of a passenger.

Alternatively, the wrap 20 may be of any suitable shape or size to hold various airbags and airbag modules.

The substantial U-shaped tear seam 22 in the wrap 20 eliminates the need for the occupant protection device 10 to include a separate diffuser to force the airbag 30 to deploy in the proper position, i.e. between the lower rim 42 of the steering wheel 40 and a driver.

Figure 6:
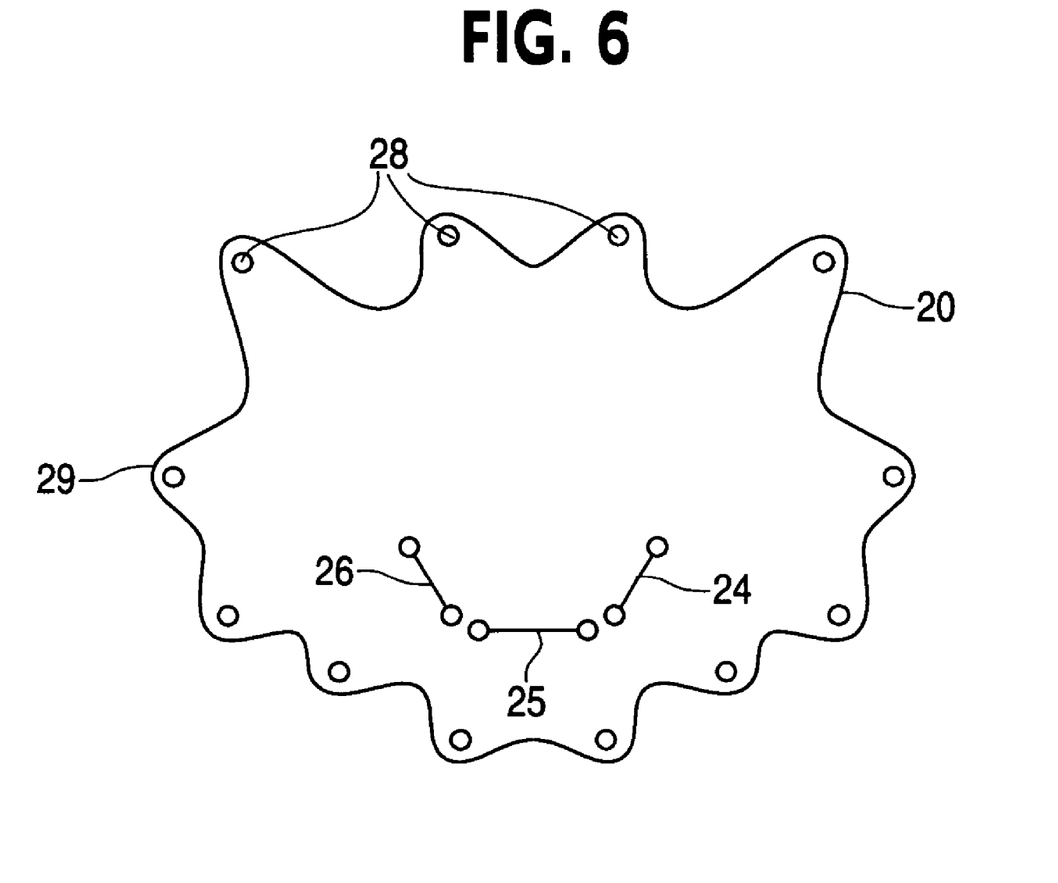
FIG. 6 is a view of a wrap according to another embodiment of the present invention.

In the above embodiment, the wrap 20 comprises a single seam to form the generally U-shaped tear seam 22. According to another embodiment shown in FIGS. 6 and 7, the wrap 20 may include three separate tear seams 24, 25, 26, as shown in FIG. 6. The three tear seams 24, 25, 26 include a bottom portion 25 and first and second extending portions 24, 26. The three tears seams 24, 25, 26 may form a curve or substantial "U" shape. Additionally, the U-shaped tear seam may comprise any number of separate seams to form the U-shape.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A driver side occupant protection device, comprising:
an airbag positioned in a steering wheel of a vehicle;
an inflator for providing inflation gas to inflate the airbag; and
a wrap initially covering the airbag when the airbag is in a folded position, the wrap including a tear seam configured to tear upon inflation of the airbag,
wherein the tear seam is configured to direct the airbag to deploy between a lower rim of the steering wheel and a driver of the vehicle, and
wherein the wrap includes a central region and a surrounding edge region, the entire tear seam being located only in the central region.

2. The driver side occupant protection device of claim 1, wherein the tear seam comprises a V shape.

3. The driver side occupant protection device of claim 1, wherein the tear seam is positioned approximately in the lower, center region of the wrap.

4. The driver side occupant protection device of claim 1, wherein the wrap comprises a single panel.

5. The driver side occupant protection device of claim 1, wherein the wrap includes three tear seams.

6. The driver side occupant protection device of claim 5, wherein the three tear seams are configured to form a substantial U shape.

7. The driver side occupant protection device of claim 1, wherein the wrap is positioned over the airbag between the folded portion of the airbag and the cover.

8. The driver side occupant protection device of claim 1, wherein the wrap comprises a woven fabric.

9. The driver side occupant protection device of claim 1, wherein the wrap is attached to the retainer.

10. An airbag module, comprising:
an airbag;
an inflator for providing inflation gas to inflate the airbag; and
a wrap initially covering the airbag when the airbag is in a folded position, the wrap including a tear seam configured to tear open upon inflation of the airbag,
wherein the entire tear seam is configured to form a single substantially U-shaped seam extending along the lower, center region of the wrap.

11. The airbag module of claim 10, wherein the tear seam is positioned toward the bottom of the airbag module.

12. The airbag module of claim 10, wherein the wrap comprises a single panel.

13. An airbag module, comprising:
an airbag;
an inflator for providing inflation gas to inflate the airbag; and
a wrap initially covering the airbag when the airbag is in a folded position, the wrap including a tear seam configured to tear open upon inflation of the airbag,
wherein the tear seam forms a substantial U shape extending along the lower, center region of the wrap, and
wherein the wrap includes three tear seams.

14. An airbag module, comprising:
an airbag;
an inflator for providing inflation gas to inflate the airbag; and
a wrap initially covering the airbag when the airbag is in a folded position, the wrap including a tear seam configured to tear open upon inflation of the airbag,
wherein the tear seam forms a substantial U shape extending along the lower, center region of the wrap, and
wherein the tear seam includes a bottom portion and first and second extending portions.

15. The driver side occupant protection device of claim 1, wherein the tear seam includes three discrete portions forming a substantial U shape, the portions including a first portion forming a bottom portion and second and third portions extending from opposite ends of the first portion.

16. An airbag module, comprising:
an airbag;
an inflator for providing inflation gas to inflate the airbag; and
a wrap initially covering the airbag when the airbag is in a folded position, the wrap including a tear seam configured to tear open upon inflation of the airbag,
wherein the tear seam forms a substantial U shape extending along the lower, center region of the wrap, and
wherein the tear seam includes three discrete portions forming the substantial U shape, the portions including a first portion forming a bottom portion and second and third portions extending from opposite ends of the first portion.

17. An airbag module, comprising:
an airbag;
an inflator for providing inflation gas to inflate the airbag; and
a wrap initially covering the airbag when the airbag is in a folded position, the wrap including a tear seam configured to tear open upon inflation of the airbag,
wherein the tear seam forms a substantial U shape extending along the lower, center region of the wrap, and
wherein no portion of the tear seam is adjacent an edge of the wrap.

18. The airbag module of claim 10, wherein the wrap includes a central region and a surrounding edge region, the entire tear seam being located only in the central region.

* * * * *